US012627592B2

(12) United States Patent

Basu et al.

(10) Patent No.: US 12,627,592 B2

(45) Date of Patent: May 12, 2026

(54) METHODS AND SYSTEMS FOR SCHEDULING AND ROUTING ON DIRECT CONNECT TOPOLOGIES

(71) Applicant: RTX BBN Technologies, Inc., Cambridge, MA (US)

(72) Inventors: Prithwish Basu, Westford, MA (US); Joud Khoury, Boston, MA (US); Siddharth Pal, Waltham, MA (US)

(73) Assignee: RTX BBN TECHNOLOGIES, INC., Cambridge, MA (US)

( * ) Notice: Subject to any disclaimer, the term of this patent is extended or adjusted under 35 U.S.C. 154(b) by 161 days.

(21) Appl. No.: 18/405,626

(22) Filed: Jan. 5, 2024

(65) Prior Publication Data

US 2025/0227054 A1 Jul. 10, 2025

(51) Int. Cl.
*H04L 45/12* (2022.01)
*H04L 45/125* (2022.01)
*H04L 45/28* (2022.01)

(52) U.S. Cl.
CPC .......... *H04L 45/123* (2013.01); *H04L 45/125* (2013.01); *H04L 45/28* (2013.01)

(58) Field of Classification Search
CPC ...... H04L 45/123; H04L 45/125; H04L 45/28
See application file for complete search history.

(56) References Cited

U.S. PATENT DOCUMENTS

2012/0087377 A1* 4/2012 Lai .......................... H04L 45/04
370/427
2015/0200867 A1* 7/2015 Dutta .................. H04L 41/0896
709/226

OTHER PUBLICATIONS

Pal et al., "Efficient All-to-All Collective Communication Schedules for Direct-Connect Topologies", eprint arXiv:2309.13541, Sep. 2023, pp. 1-17.
Zhao et al., "Efficient Direct-Connect Topologies for Collective Communications". arXiv:2202.03356v4, Sep. 2023, pp. 1-32.

* cited by examiner

*Primary Examiner* — Caroline H Jahnige

(74) *Attorney, Agent, or Firm* — CANTOR COLBURN LLP

(57) ABSTRACT

Aspects of this disclosure relate to determining a first bandwidth of one or more intracluster links between one or more nodes of a first cluster; determining a second bandwidth of one or more intercluster links between the first cluster and one or more clusters; determining an equivalency between the one or more intracluster links and the one or more intercluster links based on the first bandwidth and the second bandwidth; and preparing a routing schedule based on the equivalency.

17 Claims, 9 Drawing Sheets

202 — Determine Network Topology

204 — Clustered Nodes?

NO → Prepare Schedule and/or Routing — 206

YES

208 — Determine Characteristics of Connections Between Clusters

210 — Determine Characteristics of Connections within Clusters

212 — Do Characteristics Differ?

NO →

YES

214 — Normalize Characteristics and Convert

216 — Prepare Routing and/or Scheduling

200

402

404

Node
0

Node
m-1

Common Link

406

400

408

Direct Connect Topology

NIC

NIC

NIC

NIC

402a

404a

402b

404b

Node
0

Node
m-1

Node
0

Node
m-1

Common Link

Common Link

406a

406b

400a

400b

450

METHODS AND SYSTEMS FOR SCHEDULING AND ROUTING ON DIRECT CONNECT TOPOLOGIES

STATEMENT REGARDING FEDERALLY SPONSORED RESEARCH OR DEVELOPMENT

This application was made with government support under Contract No. HR001120C0089, owned by the Department of Defense. The U.S. Government may have certain rights in this invention.

BACKGROUND

1. Field of the Disclosure

At least one example in accordance with the present disclosure relates generally to scheduling and routing of data in direct connect topologies.

2. Discussion of Related Art

In machine learning, high end computation, and other computationally intensive applications, direct connect topologies may facilitate simultaneous transmission of data in a timely manner between nodes in the computational network, thereby allowing for efficient use of nodes in the computational network.

SUMMARY

According to at least one aspect of the present disclosure, a method for managing links in a network is presented, the method comprising: determining a first bandwidth of one or more intracluster links between one or more nodes of a first cluster; determining a second bandwidth of one or more intercluster links between the first cluster and one or more clusters; determining an equivalency between the one or more intracluster links and the one or more intercluster links based on the first bandwidth and the second bandwidth; and preparing a routing schedule based on the equivalency.

In some examples, preparing a routing schedule based on the equivalency includes: determining one or more virtual links between the one or more nodes of the first cluster, the one or more virtual links being based on the one or more intracluster links and the equivalency. In some examples, determining an equivalency between the one or more intracluster links and the one or more intercluster links includes: determining a baseline bandwidth corresponding to a bandwidth of at least one of the one or more intercluster links; and determining the first bandwidth as a multiple of the baseline bandwidth. In some examples, the equivalency is the multiple and a total quantity of the one or more virtual links is based on the multiple and a quantity of the one or more intracluster links. In some examples, the method further comprises determining that a link between a first node and a second node is not functioning properly; and responsive to determining that the link is not functioning properly, redetermining the routing schedule. In some examples, the link not functioning properly corresponds to the link not providing a bandwidth for which the link is rated. In some examples, the method further comprises determining a ratio of the first bandwidth to the second bandwidth; based on the ratio, determining a cost of sending a message via a link between a first node and a second node in the network; and determining a runtime of an operation on the network based on the cost. In some examples, determining the cost includes: determining a first cost of one or more intercluster links between the first node and the second node; determining a second cost of one or more intracluster links between the first node and the second node; and based on the first cost, the second cost, and a size of the message, determining the cost. In some examples, the method further comprises sending a message from a first node to a second node in the network based on the routing schedule. In some examples, sending a message from the first node to the second node in the network includes: partitioning the message into a first portion and a second portion; sending, from the first node to the second node, the first portion via a first link at a first timestep; sending, from the first node to the second node, the second portion via a second link at a second timestep, the second timestep following the first timestep. In some examples, the method further comprises determining one or more first splitting coefficients; determining one or more second splitting coefficients; determining the first portion based on the one or more first splitting coefficients; determining the second portion based on the one or more first splitting coefficients; determining the first link based on the one or more second splitting coefficients; and determining the second link based on the one or more second splitting coefficients. In some examples, the one or more first splitting coefficients are determined based on one or more constraints including a workload constraint limiting the amount of data received by a node to a maximum amount of data, a coefficient limiting constraint limiting a sum of the one or more first splitting coefficients and the one or more second splitting coefficients to one, and a third constraint limiting each splitting coefficient of the one or more first splitting coefficients and the one or more second splitting coefficients to be greater than or equal to zero and less than or equal to one.

According to at least one aspect of the present disclosure, a non-transitory computer-readable medium containing thereon instructions for instructing at least one processor to manage a network is presented, the instructions instructing the at least one processor to: determine a first bandwidth of one or more intracluster links between one or more nodes of a first cluster; determine a second bandwidth of one or more intercluster links between the first cluster and one or more clusters; determine an equivalency between the one or more intracluster links and the one or more intercluster links based on the first bandwidth and the second bandwidth; and prepare a routing schedule based on the equivalency.

In some examples, the instructions further instruct the at least one processor to: determine one or more virtual links between the one or more nodes of the first cluster, the one or more virtual links being based on the one or more intracluster links and the equivalency. In some examples, the instructions further instruct the at least one processor to: determine that a link between a first node and a second node is not functioning properly; and responsive to determining that the link is not functioning properly, redetermine the routing schedule. In some examples, the instructions further instruct the at least one processor to: determine a ratio of the first bandwidth to the second bandwidth; based on the ratio, determine a cost of sending a message via a link between a first node and a second node in the network; and determine a runtime of an operation on the network based on the cost. In some examples, the instructions further instruct the at least one processor to: send a message from a first node to a second node in the network based on the routing schedule by: partitioning the message into a first portion and a second portion; sending, from the first node to the second node, the first portion via a first link at a first timestep; sending, from the first node to the second node, the second portion via a second link at a second timestep, the second timestep following the first timestep. In some examples, the instructions further instruct the at least one processor to: determine one or more first splitting coefficients; determine one or more second splitting coefficients; determine the first portion based on the one or more first splitting coefficients; determine the second portion based on the one or more first splitting coefficients; determine the first link based on the one or more second splitting coefficients; and determining the second link based on the one or more second splitting coefficients. In some examples, the instructions further instruct the at least one processor to determine the one or more first splitting coefficients based on one or more constraints including: a workload constraint limiting the amount of data received by a node to a maximum amount of data, a coefficient limiting constraint limiting a sum of the one or more first splitting coefficients and the one or more second splitting coefficients to one, and a third constraint limiting each splitting coefficient of the one or more first splitting coefficients and the one or more second splitting coefficients to be greater than or equal to zero and less than or equal to one.

According to at least one aspect of the present disclosure, a system for managing links on a network is presented, the system comprising: a first cluster; one or more clusters coupled to the first cluster; a controller configured to control the first cluster and the one or more clusters by: determining a first bandwidth of one or more intracluster links between one or more nodes of a first cluster; determining a second bandwidth of one or more intercluster links between the first cluster and one or more clusters; determining an equivalency between the one or more intracluster links and the one or more intercluster links based on the first bandwidth and the second bandwidth; and preparing a routing schedule based on the equivalency.

BRIEF DESCRIPTION OF THE DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Figure 1:
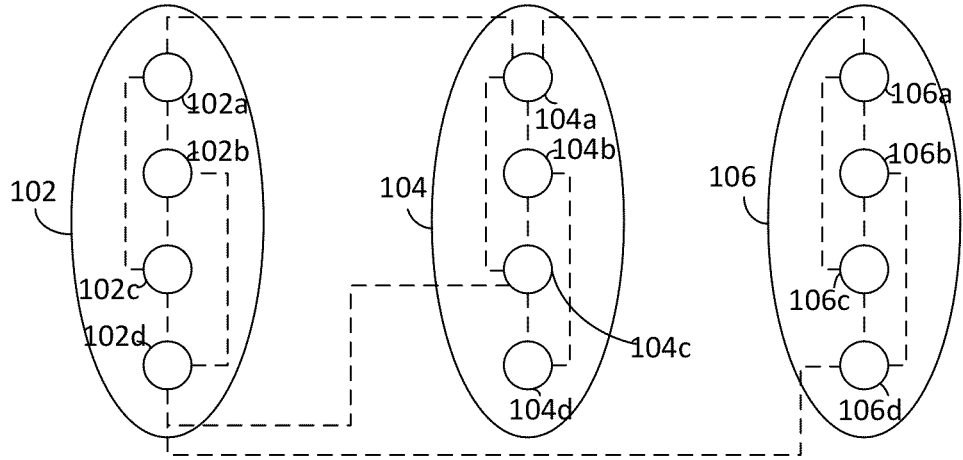
FIG. 1 illustrates a topology with clusters, according to an example.

In high end computational applications, such as machine learning, efficient scheduling and routing of data on a topology may be necessary to efficiently perform operations. For example, in some machine learning applications, each computational node of the topology may be assigned a set of operations to perform, the set of operations being a subset of the total number of operations to be performed. Each node may execute the operations assigned to it in parallel with one another, with the objective being that each node finishes executing its operations simultaneously. Each node can then transmit the results of its operations to some or all of the other nodes. The other nodes can then use those results to perform additional operations that depend on those results.

Accordingly, in some examples, the speed with which the nodes may complete all operations assigned to them and/or necessary to perform to complete the task assigned to the nodes may depend on when the slowest node completes its operations and/or how long it takes the results of the nodes to be propagated through the topology. Aspects and elements of this disclosure relate to methods and systems for routing data through and/or transforming data using a given topology in an efficient manner. For simplicity, reference to routing and/or transforming data as described herein will be made to routing data, but applies equally to transforming data. In some examples, the aspects and elements of this disclosure apply particularly to heterogeneous topologies, such as heterogeneous topologies having high intra-server bandwidth and low inter-server bandwidth.

Topologies may be optimized for given purposes. For example, a ring topology may be desirable in some cases, while a tree topology may be preferable in others. However, regardless of the topology, data will be routed between nodes on the topology. Therefore, even for a highly optimized topology, routing the data properly is still necessary to optimize the performance of the topology.

Some methods are disclosed herein for improving the scheduling and routing on a given topology. These methods may involve clustered nodes, connections between nodes within a cluster, and connections between nodes in different clusters. Clustered nodes are, in some examples, groups of nodes that are linked together in the same cluster. For example, a group of nodes connected by a common backplane or a common bus may be a cluster of nodes. Individual clusters may, in turn, be connected to other clusters via network interface controllers (NICs) or other switching and/or routing devices. As a result, the bandwidth available for transmitting data between nodes within a cluster and between nodes in different clusters may differ. For example, a backplane or common bus may provide different bandwidth than is provided by a connection to a node in another cluster. As a result, routing and scheduling may be modified to take into account the nature of the connections between clusters and clustered nodes.

To account for the difference in bandwidth available between clustered nodes and non-clustered nodes, the connections between clustered nodes may be counted as a multiple of the connections between non-clustered nodes. For example, consider a situation where a typical connection between a first node in a first cluster and a first node in a second cluster has a bandwidth of n bits per second. A connection between a first node in the first cluster and a second node in the first cluster may have a bandwidth of k·n bits per second, where k is greater than or equal to zero, and may often be greater than one. As a result, the bandwidth kn may be different than the bandwidth n. As a result, if the connection between the first node in the first cluster and the first node in the second cluster is counted as "1" connection, the connection between the first node in the first cluster and the second node in the first cluster may be counted as "k" connections. Then, using a routing and scheduling optimization algorithm, the routing and scheduling for the topology may be determined in a way that efficiently uses the available bandwidth, and thus minimizes transmission time and ensures data is shared between nodes quickly and nearly simultaneously. In particular, all connections in the topology (intracluster connections between nodes in a given cluster, and intercluster connections between clusters in the topology) may be used simultaneously and efficiently, thus ensuring no bandwidth is wasted.

Existing methods (such as recursive halving doubling or simply "recursive halving") do not efficiently use bandwidth in the manner described above. For example, recursive halving is a technique that require clusters operate in parallel and complete all operations before sharing data with other clusters. Thus, recursive halving uses intracluster connections first, and then intercluster connections second, instead of using them simultaneously. As a result, the bandwidth and capabilities of the intercluster connections are wasted while the clusters perform their operations in parallel, and the bandwidth and capabilities of the intracluster connections are wasted when the clusters share data between each other. As a result, the methods and techniques disclosed herein represent a substantial improvement over the state-of-the-art.

In the following discussion, especially of FIG. 7 and FIG. 8, the terms "shard" and "chunk" may be used. These terms may be understood as follows. For a network (or topology) of N nodes operating on data of size M, the data can be divided into N shards. In some examples, the data (of size M) may be a vector. As a result, a shard may be understood as a portion of the total data (or data vector) equal to M/N of M (or 1\N of M). A chunk may be understood as a subset of a shard. Thus, a chunk of a given shard is a portion of that shard. Chunks and shards may both be transmitted on the network as communications or transmissions between nodes.

FIG. 1 illustrates a topology 100 with clusters according to an example. The topology 100 includes a first cluster 102, a second cluster 104, and the third cluster 106. The first cluster includes a first node 102a, a second node 102b, a third node 102c, and a fourth node 102d. The second cluster 104 includes a fifth node 104a, a sixth node 104b, a seventh node 104c, and an eighth node 104d. The third cluster 106 includes a ninth node 106a, a tenth node 106b, an eleventh node 106c, and a twelfth node 106d. The topology 100 includes two types of connections: intracluster connections between nodes within a cluster, and intercluster connections between nodes in different clusters. Although only a few connections are illustrated, it will be appreciated that any given node could be coupled to any other given node.

As illustrated, the first node 102a is coupled to the second node 102b, the third node 102c, and the fifth node 104a. The second node 102b is coupled to the first node 102a, the third node 102c, and the fourth node 102d. The third node 102c is coupled to the first node 102a and the second node 102b, and the fourth node 102d. The fourth node 102d is coupled to the third node 102c, the second node 102b, the seventh node 104c, and the twelfth node 106d.

The fifth node 104a is coupled to the first node 102a, the sixth node 104b, the seventh node 104c, and the ninth node 106a. The sixth node 104b is coupled to the fifth node 104a, the seventh node 104c, and the eighth node 104d. The seventh node 104c is coupled to the fifth node 104a, sixth node 104b, eighth node 104d, and fourth node 102d. The eighth node 104d is coupled to the sixth node 104b and seventh node 104c.

The ninth node 106a is coupled to the fifth node 104a, the tenth node 106b, and the eleventh node 106c. The tenth node 106b is coupled to the ninth node 106a, the eleventh node 106c, and the twelfth node 106d. The eleventh node 106c is coupled to the ninth node 106a, the tenth node 106b, and the twelfth node 106d. The twelfth node 106d is coupled to the tenth node 106b, eleventh node 106c, and fourth node 102d.

Each node may be a computational device of some sort. For example, the nodes may be processors, GPUs, tensor cores, microcontrollers, FPGAs, ASICs, and so forth. The nodes may all be of the same type or of different types of computational device. The nodes may, in some examples, be of the same type as the other nodes within the same cluster, but of different types than nodes in other clusters.

The nodes of the first cluster 102 may be connected to one another via a common hardware bus, backplane, or other device. The nodes of the second cluster 104 may be connected to one another via a common hardware bus, backplane, or other device. The nodes of the third cluster 106 may be connected to one another via a common hardware bus, backplane, or other device.

The connections between different nodes may have different bandwidths and/or other characteristics. For example, the connections between the nodes of the first cluster 102 (e.g., between the first node 102a, second node 102b, third node 102c, and fourth node 102d) may have more or less bandwidth than the connections of those nodes to other clusters. For example, the bandwidth of the connection between the fourth node 102d and the seventh node 104c and/or twelfth node 106d may be greater than or less than the bandwidth of the connection between the fourth node 102d and the third node 102c and/or second node 102b.

As a result of the differing transmission speeds (e.g., bandwidths) between nodes, some routes may be more or less efficient than other routes. In a simple example, consider data originating with the first node 102a and going to the tenth node 106b. Suppose further that the rate of transmission is a constant A bits per second for all intracluster connections, and is a constant B bits per second for all intercluster connections. Numerous possible routes between the first node 102a and tenth node 106b exist. For example, a first route goes from the first node 102a through the fifth node 104a and ninth node 106a before arriving at the tenth node 106b. A second route goes from the first node 102a through the third node 102c, fourth node 102d, and twelfth node 106d before arriving at the tenth node 106b.

Suppose B bits are being sent from the first node 102a to the tenth node 106b, and suppose A equals nB. Sending B bits along the first route may take two seconds for the two intracluster connections plus 1/n seconds for the single intercluster connection in the first route. Sending data along the second route, by contrast, may take 1 second for the single intercluster connection plus 3/n seconds for the three intracluster connections along the second route. Thus, when n equals 2, both routes are equally fast, while when n is greater than 2 the second route is faster, and when n is less than 2 the first route is faster. Thus, when the intracluster connections are sufficiently faster than the intercluster connections, for some topologies, including the topology 100 illustrated in FIG. 1, routes with more steps (e.g., nodes) may be faster than routes with fewer nodes.

The above example Is relatively simple. However, each node, as mentioned above, may be executing operations and transmitting data in parallel (e.g., simultaneously). The amount of data being transmitted by a given node may vary from that of other nodes, and the most efficient routes from one node to another node may correspondingly vary depending on the amount of bandwidth available on a given connection for data provided by a given node. Thus, in some cases, it may be overall more efficient (e.g., overall faster) to route some data from a node along a route that is slower than the fastest possible route if, for example, the bandwidth of the fastest possible route would be better used for different data. One simple example is a case where there are three possible routes, a fastest route, a second fastest route, and a slowest route. Suppose if the first node 102a uses the fastest route that only the slowest route will be available to the sixth node 104b. But, if the first node 102a uses the second fastest route, then the fastest route becomes available to the sixth node 104b. In such a case, the transmission time is limited by the slowest route in the first case and by the second fastest route in the second case, making the second case more efficient when both nodes need to transmit data as fast as possible at the same time.

When referring to scheduling and routing, the above examples illustrate the core principles of choosing when to send data, and along which paths, such that the time spent sending and receiving data is minimized. It is noteworthy that, in some applications, routing data between nodes can take the majority of the time and determining efficient routes can be computationally difficult.

For example, consider a directed ring comprising nodes A, B, and C. During an Allreduce operation and/or Reduc-escatter operation, if A is responsible for reducing shard one, B is responsible for reducing shard two, and C is responsible for reducing shard three, then a naïve routing protocol might establish two flows in the network, a first flow ABC connecting A to C via B, and a second flow BC connecting B to C. In this naïve example, A transmits its components of shard three to C via ABC, while B transmits its component of shard three to C via BC (likewise, C and B may transmit their portions of shard one to A along similar connections CBA and BA, respectively, as may A and C transmit their portions of shard two to B). As a result, to reduce shard three requires two independent flows ABC and BC.

However, instead of using two independent flows, B can simply aggregate its portion of shard three with A's portion of shard three, and send the aggregate to C, rather than A and B transmitting their portions of shard three independently via different flows. This form of aggregation can substantially reduce the amount of bandwidth compared to the two independent flows, ABC and BC, described above.

Likewise, during an Allgather operation, the reduced shards may be distributed in similar manner. For example, rather than using multiple independent flows to send reduced shard three from C to B and A separately, two transmissions may instead be used (one from C to B, and one from B to A), thereby reducing bandwidth required.

This aggregation and routing is very challenging, and generally intractable to schedule optimality for arbitrary network topologies. Thus, in computationally intensive applications where data is often routed simultaneously between multiple nodes, inefficient routing can unnecessarily extend the amount of time needed to complete a task.

Figure 2:
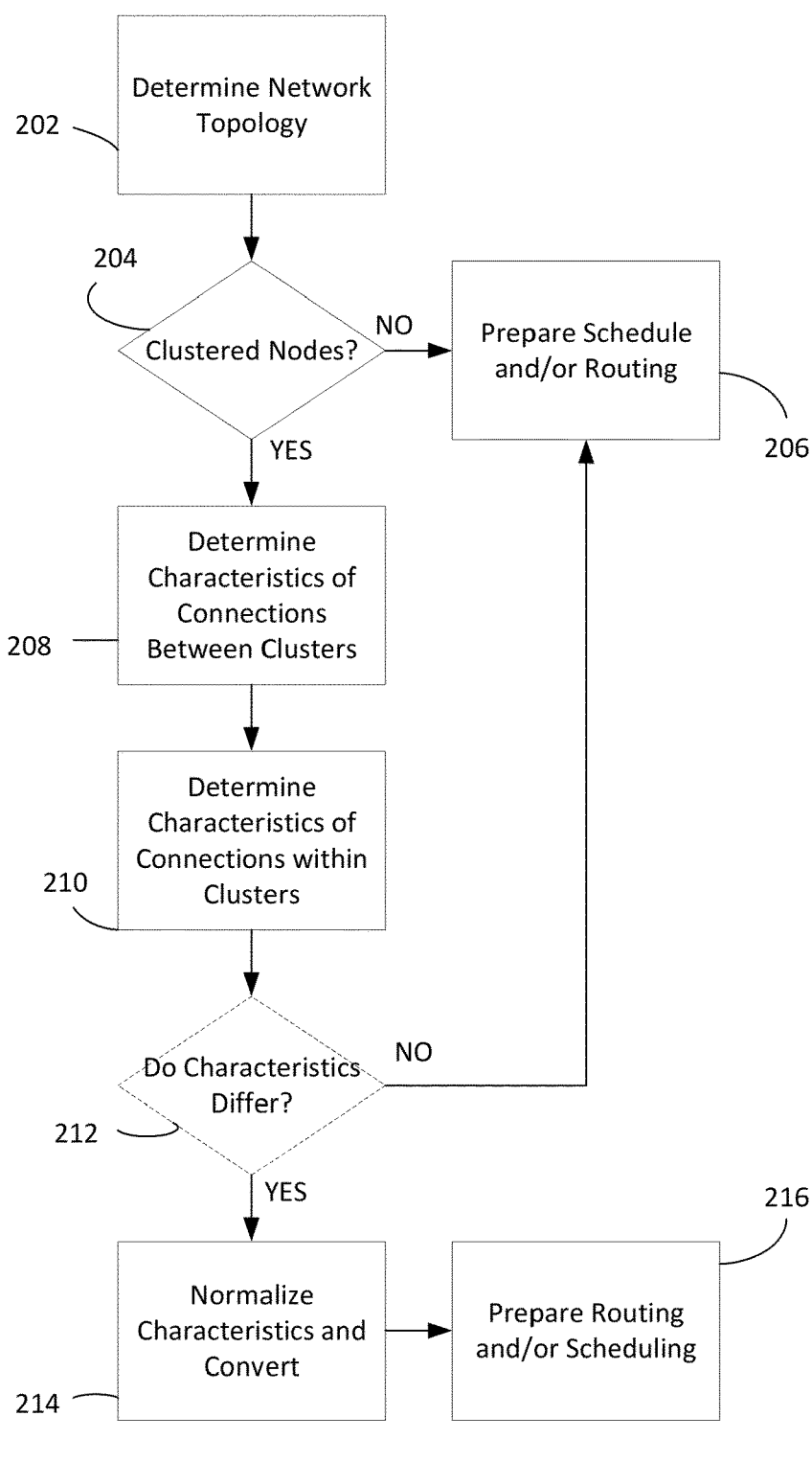
FIG. 2 illustrates a process for converting connections between nodes so that optimal routing and scheduling can be determined, according to an example.

FIG. 2 illustrates a process 200 for converting all connections (also called links or edges) between nodes into a common form, so that optimal routing and scheduling can be determined, according to an example. In general, the process 200 involves converting connections based on bandwidth (and other characteristics) into comparable units, so that at least one controller ("controller") may determine the routes and schedules for data transmission within the topology.

At act 202, the controller determines the network topology. The controller may be provided with knowledge of the connections and/or potential connections between nodes, the number of nodes, the purpose of the network, and so forth, and may adjust the connections between nodes to best suit the particular purpose of the network. For example, as mentioned above, some topologies have high bandwidth but high latency, while others have low latency but low bandwidth, and some topologies straddle the extremes between favoring high bandwidth and favoring low latency. Depending on the application to be executed by the network, one of bandwidth or latency may be relatively more important than the other, and thus one topology may be superior to another for the specific application. The controller may determine the network topology using any method for determining a network topology. It may be assumed, in some examples, that the controller has an accurate and complete map of the entire topology and all link characteristics. In some examples, the controller may have an accurate and complete map of the entire topology and all link characteristics where the topology is limited to Machine Learning Clusters, while in some examples the controller may not have such an accurate and complete map in dynamic large scale networks (such as the internet). The process 200 may then continue to act 204.

At act 204, the controller determines whether clustered nodes are present in the topology. The controller may determine whether clustered nodes are present based on the controller's preexisting knowledge of the network topology. Alternatively, the controller may ping nodes within the network and monitor acknowledge signals from throughout the network to determine the speeds of connections between nodes and thereby infer whether nodes are clustered or not. Alternatively, the controller may receive inputs indicating which nodes are clustered. If the controller determines no clustered nodes are present within the topology (204 NO), the process 200 may continue to act 206. If the controller determines clustered nodes are present within the topology (204 YES), the process 200 may continue to act 208.

At act 206 the controller prepares the routes and schedules for data transmission on the topology. While the controller may use the methods described herein to determine the routing and scheduling, the controller may also use other methods that cannot or do not accommodate clustered nodes (e.g., recursive halving or a similar method that cannot accommodate clustered nodes).

If, however, the controller determined clustered nodes were present (204 YES), the process 200 continues to act 208. At act 208, the controller determines the characteristics of connections between discrete clusters of nodes. Characteristics of the connections may include bandwidth, latency, jitter, noise, and so forth. In some examples, the controller may prioritize bandwidth and/or latency as the primary characteristics. The controller may determine the characteristics of these connections between clusters using pings and acknowledge signals, may receive inputs indicating the characteristics, or may be aware of the characteristics based on the controller's preexisting knowledge of the topology. In some examples, clusters of nodes may be connected via switching devices (such as NICs), and characteristics of the connections between the clusters may therefore be disclosed by the manufacturer of the switching device and may be programmed into the controller. The process 200 may continue to act 210.

At act 210, the controller determines the characteristics of connections between nodes within each discrete cluster. Characteristics of the connections may include bandwidth, latency, jitter, noise, and so forth. In some examples, the controller may prioritize bandwidth and/or latency as the primary characteristics. The controller may determine the characteristics of these connections between clusters using pings and acknowledge signals, may receive inputs indicating the characteristics, or may be aware of the characteristics based on the controller's preexisting knowledge of the topology. In some examples, the controller may determine the characteristics of these connections between nodes within a given cluster based on the manufacturer's data concerning the cluster, which may be programmed into the controller. For example, in some cases, clustered nodes may be located on the same processor, connected via the same backplane, and/or connected via a common bus, and so forth. In such cases, the characteristics of the processor, backplane, and/or bus may be known and/or available and may therefore be provided to the controller. The process 200 may continue to act 212.

At act 212, the controller determines whether the characteristics of the connections between clusters and the connections between nodes within given clusters differ. The controller may determine whether the difference in any characteristics of the connections between nodes and the connections between clusters exceeds a threshold amount or falls outside an acceptable range. If the threshold is exceeded or the characteristics are not within the range, the controller may determine that the characteristics of connections between nodes and between clusters differ.

For example, suppose the controller is comparing bandwidth between nodes and clusters. Suppose the connections between clusters have a bandwidth of X bps (bits per second) while the connections between nodes within a first cluster have a bandwidth of X+1 bps, and the connections between nodes within a second cluster have a bandwidth of X+2 bps. If the range to determine whether the characteristics of the connections differ is if a connection has more than plus or minus 1 bps compared to X, then the second cluster has a bandwidth that falls outside the range (and/or exceeds the threshold of X+1), and thus must be normalized. In such a case, the controller would determine that the characteristics differ.

If the controller determines that the characteristics differ (212 YES), the process 200 may continue to act 214. If the controller determines that the characteristics do not differ, the process 200 may continue to act 206.

At act 214, the controller normalizes the characteristics and converts them into a common form allowing for direct comparison. In some examples, the controller converts the connections into multiples of the "baseline" connection. For example, if the baseline is based on bandwidth and the baseline connection is X bps, but the nodes of a first cluster have a bandwidth of 50X bps (e.g., the bandwidth of connections within the first cluster is 50 times higher than the baseline connection), then the controller may determine that it should treat each node within the first cluster as having 50 connections to each other node to which it is connected within the first cluster. The controller may round the number of connections in some examples, but does not need to do so. For example, if the connections between the nodes in the first cluster were 50.6X bps, then the controller could apply a floor function to round down to 50 connections, or could round up to 51 connections. Likewise, if the controller determined the bandwidth between nodes within a cluster was 0.5X bps, the controller could adjust the baseline to equal 0.5X bps (e.g., 0.5X bps could count as 1 connection), and then adjust the baseline accordingly (e.g., to count as 2 connections). While this example uses the slowest connection for the baseline, the fastest connection may be used, as may any connection between the slowest and fastest.

More generally, whatever set of characteristics the controller is using to compare the connections, the controller may use any baseline value it desires to evaluate the characteristics. In some examples, the baseline may not correspond to an actual bandwidth, latency, or other characteristic present in the topology. For example, if the baseline is X bps but the connections are 2X bps, 3X bps, and higher (e.g., no connection is X bps), the controller may nonetheless use X as the baseline rather than using 2X, or 3X or some other value present in the topology.

Once the controller has converted the connections within clusters and between clusters into a common form, the process 200 may continue to act 216.

At act 216, the controller may use existing routing and scheduling techniques, or the techniques disclosed herein, to determine the scheduling and routing for the topology. Note that the controller does not alter the topology of the network when it determines the routing and scheduling for the network.

Figure 3:
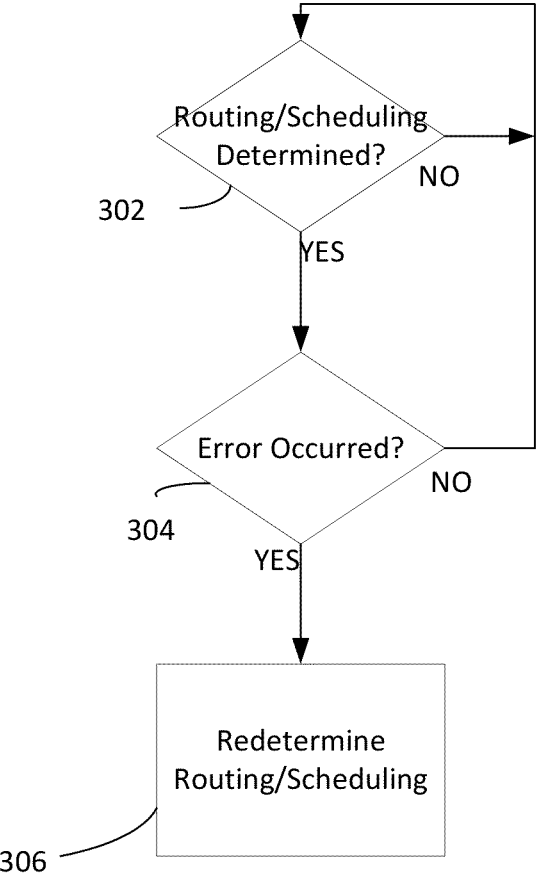
FIG. 3 illustrates a process for determining when to the routing and/or scheduling for a network, according to an example.

FIG. 3 illustrates a process 300 for determining when to redetermine (e.g., regenerate, recalculate, and so forth) the routing and/or scheduling. On a given topology, some connections, nodes, or clusters may fail. For example, a NIC used to route data from one cluster to another cluster may stop operating, or may experience a degradation in throughput that prevents it from performing the way the controller expects it to perform based on the routing and scheduling already in place. As a result, the execution of the application may slow down substantially due to the degradation in performance of the connection. Similar things can happen to nodes or clusters, with nodes and clusters burning out, becoming disconnected, suffering connection issues (e.g., due to corrosion), suffering performance issues (e.g., due to overheating), and so forth. As a result, the controller may sometimes need to redetermine the routing and/or scheduling.

At act 302, the controller determines whether scheduling or routing is in place for the topology. If the controller determines that no scheduling or routing has been determined for the topology (302 NO), the controller may return to this act (act 302) until scheduling and/or routing is determined (e.g., as described with respect to act 216 of FIG. 2). If the controller determines routing and/or scheduling is determined (302 YES), the process 300 may continue to act 304.

At act 304, the controller may determine if an error has occurred. The controller may determine whether an error has occurred based on the characteristics of the network and/or the performance of the application being executed on the network. For example, the controller may receive an indication from a sensor, a node, a switching device, and so forth, that the throughput of a node, cluster, switching device, or other part of the topology has dropped below a threshold performance level or fallen outside an acceptable performance range. In some examples, the controller may use ping and acknowledge signals to monitor the network to determine the characteristics of connections. In some examples, the controller may monitor the application running on the network and detect when the performance of the application degrades and then infer that an error has occurred. If the controller determines that an error has occurred (304 YES), the process 300 may continue to act 306. If the controller determines that an error has not occurred (304 NO), the process 300 may return to act 302.

At act 304, the controller redetermines the routing and scheduling for the network while taking into account the changes in the performance of the network due to any errors that have occurred.

Figure 4A:
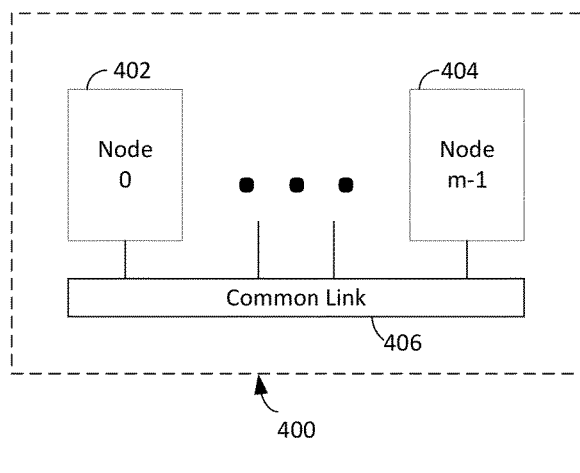
FIG. 4A illustrates a cluster of nodes according to an example.

FIG. 4A illustrates a cluster 400 of nodes according to an example. The cluster 400 includes a plurality of m nodes, labeled including a first node 402 (labeled "Node 0") and a second node 404 (labeled "Node m−1"). The nodes are coupled together via a common link 406. For example, the first node 402 is coupled to the common link 406 and the second node 404 is coupled to the common link 406.

Each node of the plurality of m nodes may be a computational device (such as a GPU, processor, ASIC, and so forth). The common link 406 may be a type of bus or other interconnect device having bandwidth, latency, and other characteristics described above. One example of a possible implementation of the common link 406 is Nvidia's NVLink™ technology. However, any suitable bus may be used.

Figure 4B:
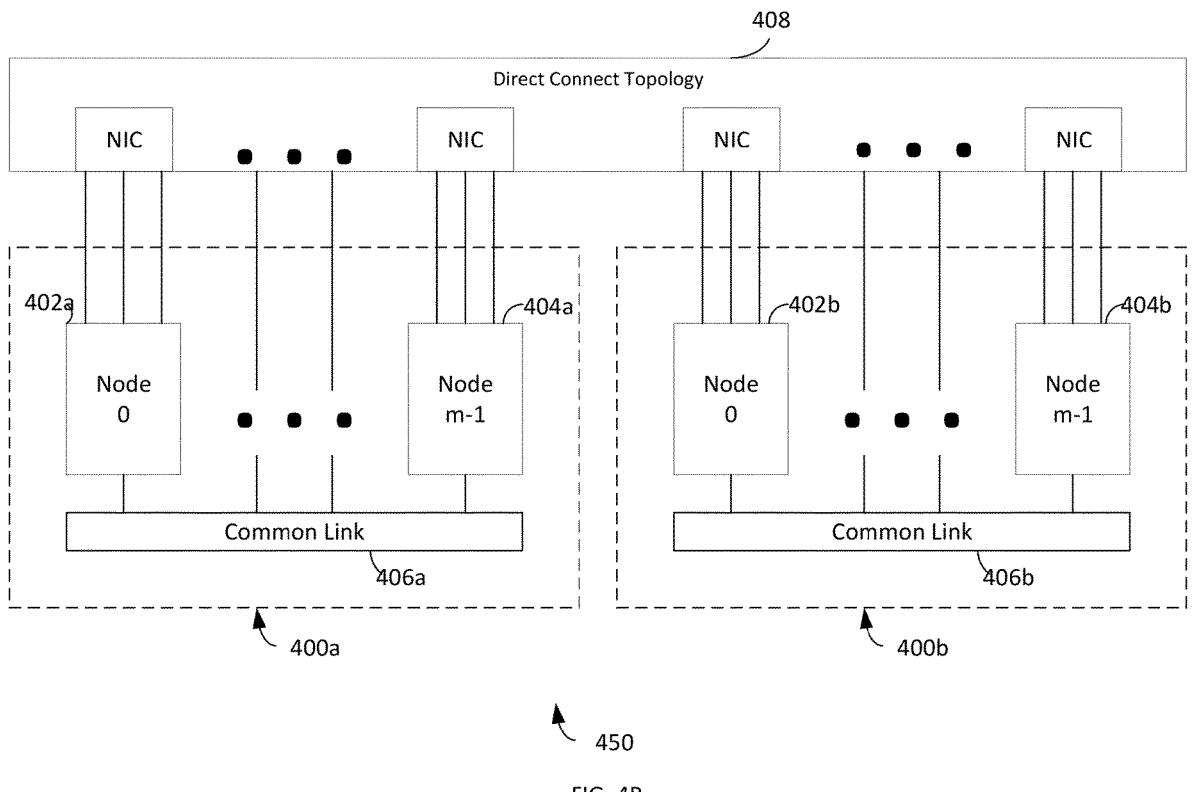
FIG. 4B illustrates a network according to an example.

FIG. 4B illustrates a network 450 including a plurality of clusters of nodes connected to a direct connect topology according to an example. The system 450 includes a first cluster 400a, a second cluster 400b, and a direct connect topology 408. The first cluster 400a may be implemented in some examples as a version of the cluster 400 of FIG. 4A. The second cluster 400b may be implemented as a version of the cluster 400 of FIG. 4A.

The first cluster 400a includes a plurality of nodes including a first node 402a and a second node 404a, as well as a common link 406a. The common link 406a couples each node of the plurality of nodes of the first cluster 400a to one another. The second cluster 400b includes a plurality of nodes including a first node 402b and a second node 404b, as well as a common link 406b. The common link 406b couples each node of the plurality of nodes of the second cluster 400b to one another.

The direct connect topology 408 may be coupled to each node of the first cluster 400a and/or second cluster 400b. The direct connect topology 408 may have one or more connections to each node of the first cluster 400a and the second cluster 400b. For example, as illustrated, the direct connect topology 408 is coupled via three connections to the first node 402a, via three connections to the second node 404a, via three connections to the first node 402b, and via three connection to the second node 404b. The direct connection topology 408 may be a network of switching devices, such as NICs, configured in point-to-point connections (rather than using standard packet switches). In some examples, the methods and techniques described herein may not be applicable to networks linked using standard packet switches.

In many examples, the common links 406a, 406b may provide relatively high bandwidth between the nodes of their respective clusters 400a, 400b compared to the bandwidth provided by the direct connect topology 408. For example, a connection between the first node 402a and second node 404a of the first cluster 400a via the common link 406a may have a bandwidth of 50X bps, while a connection between the first node 402a and the second node 404a of the first cluster 400a via the direct connect topology 408 may have a bandwidth of X bps. In some examples, the bandwidth available via the common links 404a, 404b of the clusters 400a, 400b between the respective nodes within those clusters may be tens, hundreds, or thousands of times higher than the bandwidth available via the direct connect topology 408. However, as the direct connect topology 408 is the only network connecting the clusters 400a, 400b to one another, when nodes of different clusters communicate they may be required to communicate via the direct connect topology 408.

The number of connections available to a given node in one cluster to other nodes via the direct connect topology 408 is a finite value greater than or equal to zero, called d. In the direct connect topology, each node in a cluster is coupled to a dedicated switching device in the direct connect topology 408 (e.g., a dedicated NIC), and the number of connections, d, that switching device can provide is the degree of the switching device.

The objective then is to find the best direct connect topology for the direct connect topology 408 to connect the switching devices that make up the direct connect topology 408, and then to find the best schedules and routes to maximize bandwidth usage and minimize latency when performing operations such as allreduce, allgather, reduce scatter, and so forth. The following processes discuss a technique for optimizing scheduling and routing according to an example.

Figure 5:
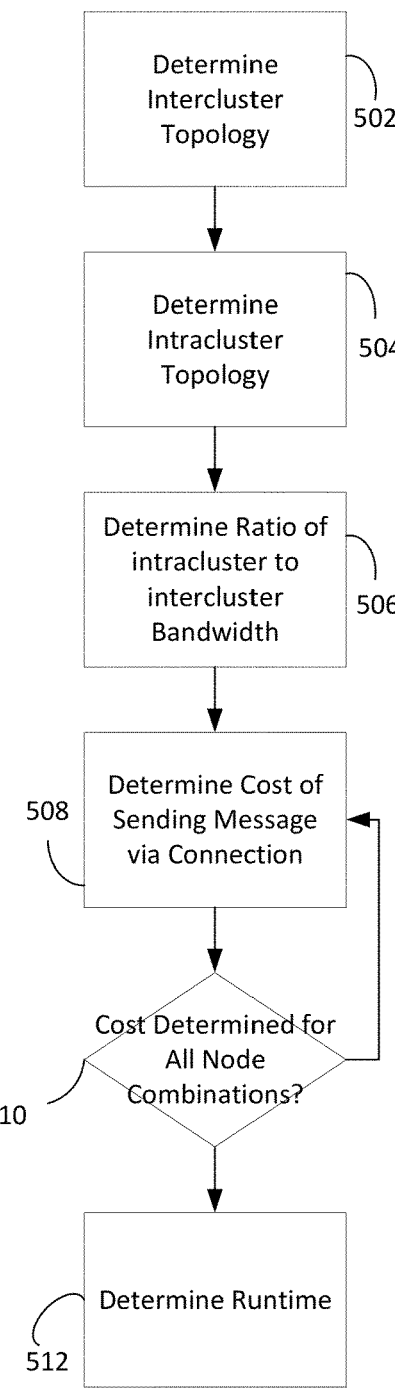
FIG. 5 illustrates a process for determining the runtime of an algorithm according to an example.

FIG. 5 illustrates a process 500 for determining the runtime of an algorithm for determining a schedule and/or route for a direct connect topology according to an example. The process 500 uses the intercluster topology and the intracluster topologies to determine a ratio of bandwidths for each of these topologies, and then determines the cost to send a message from a given node to a given destination. The runtime of the algorithm is then based on the slowest portion of the topology.

At act 502, a controller determines the intercluster topology of the network. For example, the controller may create a graph or other data object (or database) that represents the intercluster topology. The intercluster topology may be representative of the connections between clusters of nodes. For example, with respect to FIG. 4B, the internetwork topology may be the topology of the direct connect topology 408 that connects the various clusters 400a, 400b to one another. In some examples, the controller may already know the intercluster topology (for example, because the topology has been preprogrammed into the controller or because the controller designed and caused the implementation of the topology). The process 500 may then continue to act 504.

At act 504, the controller determines the intracluster topology of the clusters within the network. In some examples, each cluster may have an identical intracluster topology, however it is not necessary that each cluster have an identical intracluster topology. The intracluster topology of a given cluster may be representative of the connections between nodes within that cluster. The controller may determine the intracluster topology in various ways. For example, the controller may be aware of the connections of nodes to the common link 406 (referencing FIG. 4) because the controller designed those connections, or the intracluster topologies may be preprogrammed based on available data (e.g., manufacturer publications of topologies), and so forth. The process 500 may then continue to act 506.

At act 506, the controller determines the ratio of intracluster bandwidth to intercluster bandwidth. The ratio may be expressed by the equation:

$$R = \frac{B}{m-1} \div \frac{b}{d} = \frac{dB}{b(m-1)} \qquad (1)$$

where d is the degree of the individual switching devices (e.g., NICs) within the direct connect topology 408 that connect nodes to other nodes, b is the bandwidth of the connections of the switching devices and/or direct connect topology 408, B is the bandwidth of the intracluster connections (e.g., the connections of the common link 406), and m is the number of nodes in the system (e.g., the total number of nodes across all clusters). The process 500 may then continue to act 508.

At act 508, the controller may determine the cost of sending a communication from a given node to another given node. The controller may use an α-β cost model to determine the cost of sending a communication. The value of α may be based on and/or represent the node latency, while the value of β may be based on and/or represent the inverse of the link bandwidth (the link bandwidth being the bandwidth of the link between the sending node and receiving node of the communication). For example:

$$\beta = \frac{m-1}{B}, \text{ for intercluster links} \qquad (2)$$

$$\beta = \frac{d}{b}, \text{ for intracluster links} \qquad (3)$$

$$C = \alpha + \beta H \qquad (4)$$

where C is the cost of sending a message of size H from one node to another, and β is one of equations (2) or (3). The process 500 may continue to act 510.

At act 510, the controller determines whether all costs for all node pairs have been determined. In some examples, the controller may instead determine costs for a subset of node pairs (e.g., only those nodes sharing at least one connection). If the controller determines that some node costs have not been determined, the process 500 may return to act 508 and determine the cost for the node or nodes that have not had their costs determined. If the controller determines that no further costs need to be determined, the process 500 may proceed to act 512.

At act 512 the controller may determine the runtime of the algorithm based on the costs. For example, for a given number of communication steps, t, the runtime may be a sum of the maximum latency of all collective operations over the communication steps, and the bandwidth of the links involved in the collective operations over the communication steps.

Figure 6:
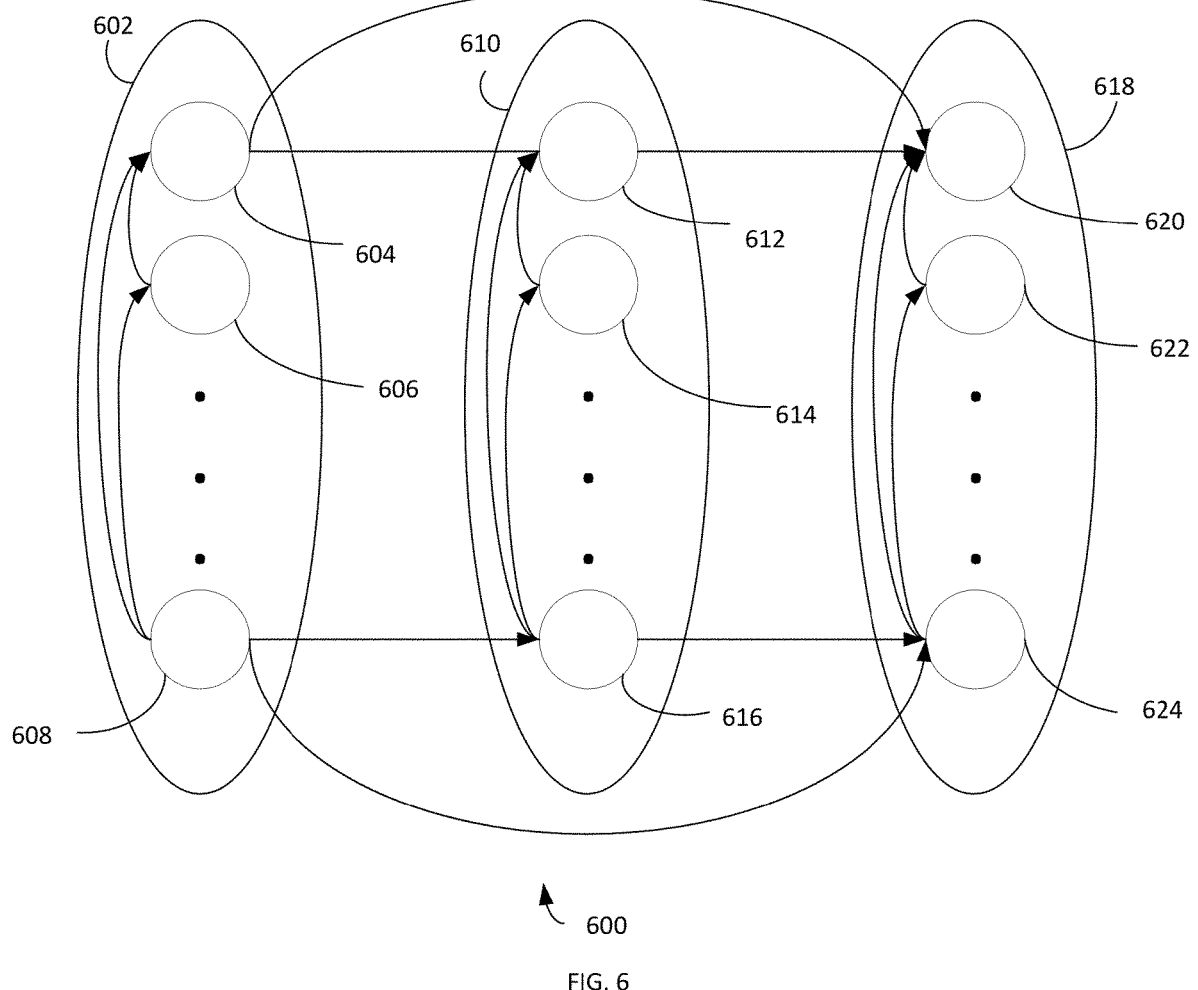
FIG. 6 illustrates a process for determining an intracluster topology according to an example, and further illustrates a clustered network topology with degree d connections according to an example.

FIG. 6 illustrates a clustered network topology 600 with degree d connections. With degree d connections, this means that each node is connected to another node of the same "index" in some or all of the other clusters.

The topology 600 includes a first cluster 602, a second cluster 610, and a third cluster 618. The first cluster 602 includes a first plurality of nodes including a first node 604, a second node 606, and a third node 608. The second cluster 610 includes a second plurality of nodes including a fourth node 612, a fifth node 614, and a sixth node 616. The third cluster 618 includes a third plurality of nodes including a seventh node 620, an eighth node 622, and a ninth node 624.

As a degree d topology, the topology 600 includes various connections between various nodes within clusters and between clusters. The nodes of the first plurality of nodes, including the first node 604, the second node 606, and the third node 608, may all have connections to one another via a common connection, such as a common link 406 of FIG. 4. A given node, such as the first node 604, second node 606, or third node 608, of the first plurality of nodes may also have d connections to nodes in other clusters. The nature of these connections will be discussed in greater detail shortly.

Similarly, the nodes of the second plurality of nodes, including the fourth node 612, fifth node 614, and sixth node 616, may all have connections to one another via a common connection, such as a common link 406 of FIG. 4. A given node, such as the fourth node 612, fifth node 614, or sixth node 616, of the second plurality of nodes may also have d connections to nodes in other clusters. The nature of these connections will be discussed in greater detail shortly.

Similarly, the nodes of the third plurality of nodes, including the seventh node 620, eighth node 622, and ninth node 624, may all have connections to one another via a common connection, such as a common link 406 of FIG. 4. A given node, such as the seventh node 620, eighth node 622, or ninth node 624, of the second plurality of nodes may also have d connections to nodes in other clusters. The nature of these connections will be discussed in greater detail shortly.

The d connections between nodes may create vertical and horizontal slices in the network. For example, each node of a given cluster (e.g., the first plurality of nodes in the first cluster 602) is coupled to at least one other node within that same cluster. This may be considered a "vertical slice" of the network. A horizontal slice of the network may be formed by the connections of nodes assigned a given index in a given cluster to other nodes assigned the same index in other clusters.

For example, in topology 600, the first node 604, fourth node 612, and seventh node 620 may each be assigned the index "0" and may be connected to each other. For example, suppose d equals two. Then the first node 604 may be communicatively coupled to the fourth node 612 and seventh node 618, the fourth node 612 may be communicatively coupled to the first node 604 and seventh node 620, and the seventh node 620 may be communicatively coupled to the first node 604 and fourth node 612. This coupling represents a horizontal slice within the network.

Similarly, the second node 606, fifth node 614, and eighth node 622 may all be assigned the same index (e.g., "1") and may be communicatively interconnected to one another. Likewise, the third node 608, sixth node 616, and ninth node 624 may all be assigned the same index (e.g., x), and communicatively interconnected to one another.

The connections between clusters (e.g., the horizontal slices of the topology 600) may have different characteristics compared to the connections within clusters (e.g., the vertical slices of the topology 600). In many examples, these intercluster "horizontal" connections may be slower (e.g., have less bandwidth) than the intracluster "vertical" connections.

In traditional approaches, the connections between nodes within clusters would not be used simultaneously with the connections between clusters, thus leading to inefficient use of network resources. To overcome this limitation, the techniques disclosed herein add "virtual edges" to the nodes and then route data between the nodes using each connection simultaneously. In some examples, these techniques involve using sequential timesteps to send partial data along various connections.

Figure 7:
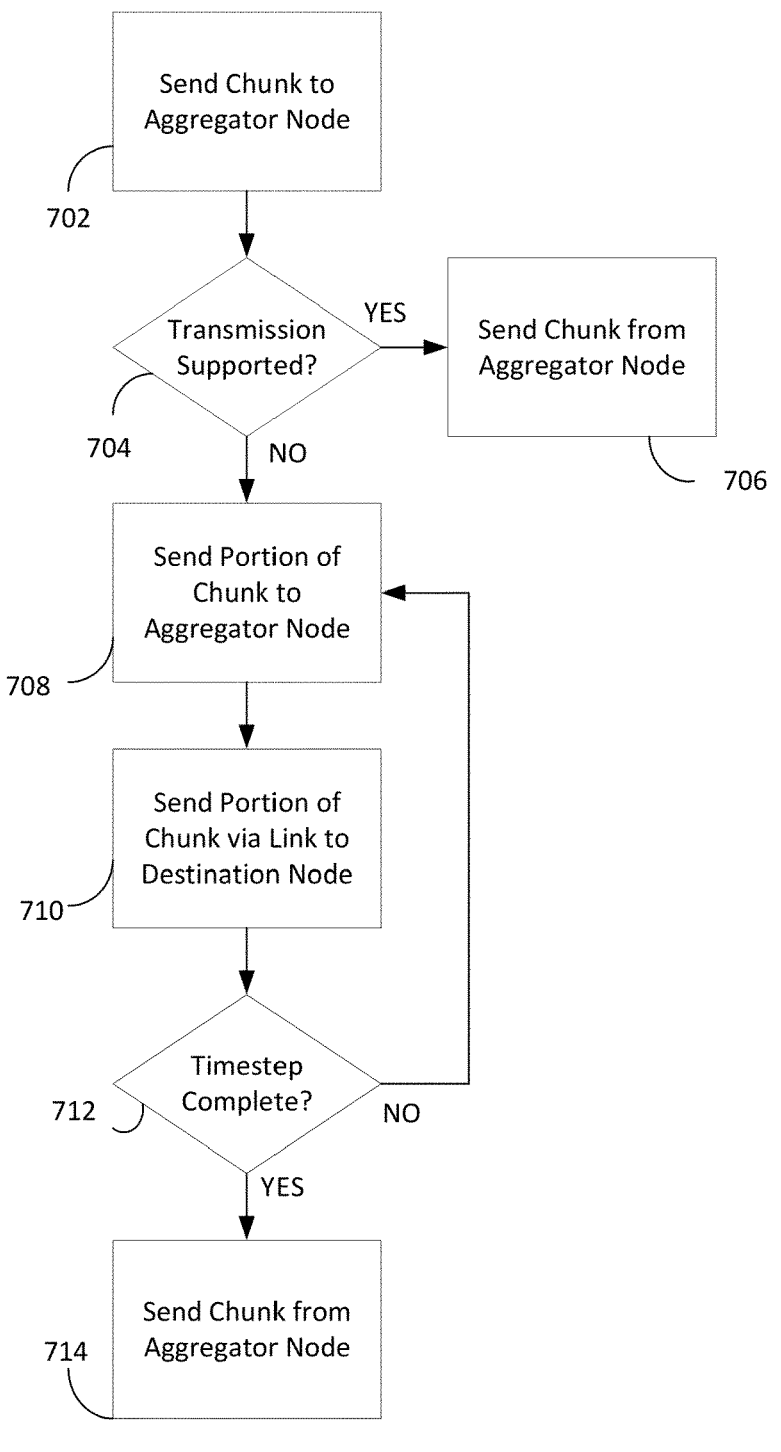
FIG. 7 illustrates a process for sending portions of data from node to node along given connections according to an example.

FIG. 7 illustrates a process 700 for sending portions of data from node to node along given connections (e.g., intranode or internode) according to an example. In some examples, the process 700 applies to a topology A containing N nodes and having degree d. That is, the process 700 may assume that a network topology A has already been determined (e.g., the connections between nodes have already been determined), that there are N nodes present on the topology A, and that each node has d connections to nodes in other clusters (e.g., each switching device or NIC can connect to up to d other nodes). In some examples, the intracluster connections of topology A have also been determined. In some examples, the process 700 may also have already determined a baseline schedule for the topology A to perform various functions (e.g., allscatter, allreduce, and so forth). The baseline schedule may be "naïve," meaning that the baseline schedule may have been determined using traditional methods that do not simultaneously use bandwidth of the intranode and internode connections in the topology A. The baseline schedule may be a Shortest-Path Furthest-First ("SPFF") schedule or a Breadth First Broadcast ("BFB"). Finally, the N nodes may be clustered; there may be an arbitrary number of clusters.

In essence, the process 700 involves adding intracluster edges (an edge is a connection) to nodes within a cluster to use as much of the intracluster bandwidth as possible, and adding intercluster edges when the intracluster bandwidth is not sufficient to support the intracluster aggregation at a given timestep. In other words, if the intracluster bandwidth is not sufficient to complete a desired operation, a portion of the data related to that operation can be sent along a different path to a different cluster to be used.

At act 702, each node within a cluster transmits a chunk to an aggregator node within the cluster. In some examples, the aggregator node need not transmit a chunk to itself. In some examples, the transmission of chunks to the aggregator chunk occurs over a first timestep. The process 700 may then continue to act 704.

At act 704, the nodes, or at least one external controller ("controller"), may determine that the transmission of chunks to the aggregator node cannot be supported. The nodes and/or controller may determine that the transmission cannot be supported if the transmission cannot be completed in a single timestep. For example, there may be insufficient bandwidth to provide the chunks to the aggregator node within the first timestep. In some examples, the latency may be so high that the chunks cannot be provided to the aggregator node within the first timestep. In other examples, other characteristics of the network may prevent the chunks from being transmitted to the aggregator node within the first timestep. If the nodes and/or controller determine that the transmission is supported (704 YES), the process 700 may continue to act 706. If the controller determines that the transmission is not supported (704 NO), the process 700 may continue to act 708.

At act 706 the aggregator node aggregates the chunks received from the other nodes within the cluster and transmits the aggregated chunk to the destination node. In some examples, the aggregator node aggregates the chunks on a second timestep (after the first timestep), and sends the aggregated chunk to the destination node on a third timestep (after the second timestep). In some examples, the aggregator node aggregates and transmits the chunks on the second timestep.

In the d degree topology 700 of FIG. 7, the aggregator node may transmit the aggregated chunk to a node with the same index as the aggregator node but located in another cluster. In topologies of greater than d degree, the aggregator node may be able to transmit the aggregated chunk to nodes with a different index than the aggregator node.

At act 708, the nodes and/or controller have determined that the transmission is not supported (704 NO). The nodes transmit a first portion of their respective chunks to the aggregator node. In some examples, the nodes transmit their respective first portions of their respective chunks on the second timestep. The process 700 may then continue to act 710.

At act 710, the nodes transmit a second portion of their respective chunks via a different route through the topology A. In some examples, the nodes transmit their respective second portions on the second timestep.

In a topology such as the d degree topology 700 of FIG. 7, a transmitting node of the cluster may transmit its second portion to a node in another cluster having the same index as the transmitting node. However, in topologies of greater than d degree, the transmitting node may be able to transmit the second portion to nodes in other clusters having a different index than the transmitting node.

The acts 708 and 710 may occur during the first timestep in some examples and/or during the same timestep in some examples.

The process 700 may then proceed to act 712.

At act 712, the controller and/or nodes may determine if the current timestep (e.g., the first timestep) is completed. If the controller and/or nodes determine the current timestep is not completed (712 NO), the process 700 may return to an earlier act, such as act 708, or may simply wait until the timestep is complete. If the controller and/or nodes determines the timestep is complete (712 YES), the process 700 may continue to act 714.

At act 714, the aggregator node may aggregate the chunks into an aggregated chunk and transmit the aggregated chunk. In some examples, act 714 may be identical to act 706 except that the aggregated chunk transmitted from the aggregator node is based on only the first portions of the chunks received by the aggregator node from the other nodes within the cluster (rather than being based on the complete chunks—that is, the first and second portions of the chunks).

In some examples, as acts 708 and 710 imply, the first portion and second portion represent a percentage of the chunk, with the sum of the first portion and second portion being 100% of a chunk a given node was going to transmit. The proportion of the chunk being sent to the aggregator node (e.g., the first portion), and the proportion of the chunk being sent elsewhere (e.g., the second portion) may be determined using splitting coefficients. The splitting coefficients represent what portion of a chunk goes to the aggregator node and what portion goes elsewhere. A technique for determining the splitting coefficients will be discussed with respect to FIG. 8.

The fact that acts 708 and 710 involve sending second portions to nodes other than the aggregator node implies that common link connections (e.g., NICs) are in use during the performance of acts 708 and 710. As a result, those connections themselves, and the amount to which they are used, are the intercluster edges, while the connections between the nodes within the cluster are intracluster edges. This means that, in some examples, the splitting coefficients determine the nature of the intracluster and intercluster edges by defining how much of a given chunk is sent to the aggregator node and how much is sent elsewhere.

Figure 8:
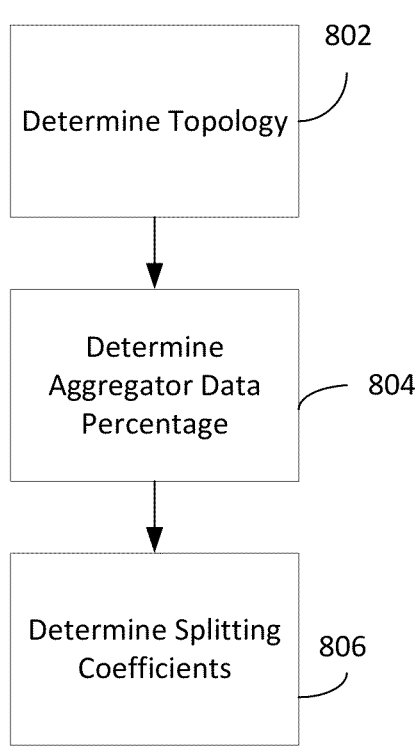
FIG. 8 illustrates a process for determining the splitting coefficients for a given schedule and/or route according to an example.

FIG. 8 illustrates a process 800 for determining the splitting coefficients for a given schedule and/or route according to an example. The splitting coefficients depend on the properties of the topology A, including the schedule of the topology A.

At act 802, at least one controller ("controller") determines the topology of the network. In some examples, the topology may be determined using a topology-optimization method, in some examples, the topology may already be known. With reference to FIG. 7, the topology A may be the topology referred with respect to process 800. The process 800 may then continue to act 804.

At act 804, the controller applies a SPFF schedule to the topology A. By applying the SPFF schedule, the controller obtains the fraction of every shard that will be sent by the aggregator node along a particular link (e.g., NIC), associated with the aggregator node. Thus, the fraction of the shard sent by the aggregator node may be considered a chunk sent by the aggregator node to the destination node. In some examples, the fraction is defined only when the route between the aggregator node and the destination node is the shortest route between those nodes. The process 800 may then continue to act 806.

At act 806, the controller applies a series of one or more constraints to the chunks and/or shards sent by the nodes in a cluster to the aggregator node (also in the cluster). In some examples, the constraints may optimize bandwidth usage and/or time to complete an operation.

A first constraint may require that a first portion of a shard and/or chunk be sent from the aggregator node to one or more destination nodes at a first time, and a second portion of the shard and/or chunk be sent from the aggregator node to one or more destination nodes at a second time. In some examples, the first portion and the second portion do not share any common elements (just as though the shard had been separated into two entirely distinct portions). In some examples, the second time is a time after the first time, and in some examples, the second time may immediately follow the first time. In some examples, the first time and second time are each one or more timesteps within the topology.

A second constraint may require that the sum of all shards and/or chunks of data coming to a node during a given timestep (e.g., the first time or second time mentioned with respect to the first constraint, though it could be at an unrelated time or any other time) does not exceed the total workload coming into and/or assigned to the node according to the SPFF. For example, a destination node may be required to receive no more data than the topology and routing schedule allow it to receive during a given timestep. In some examples, the sum of all chunks may be further adjusted to be proportional to the ratio of intracluster to intercluster bandwidth. Thus, in some examples, the second constraint may require that the amount of data arriving at a node not exceed the node's bandwidth while also not exceeding the workload assigned to the node.

A third constraint may require that the sum of the splitting coefficients for an aggregator node and a destination node do not exceed one.

A fourth constraint may require that no splitting coefficient be greater than one or less than zero.

With respect to the foregoing constraints, other constraints may also be applied, and in some examples, one or more of the first, second, third, and/or fourth constraints may be omitted.

Based on these constraints, the splitting coefficients may be determined and applied to optimize bandwidth usage.

Once the splitting coefficients are determined, the data can be sent simultaneously along both the intracluster and intercluster connections when the intracluster connections are unable to sustain the transmission (e.g., when the intracluster connections do not provide adequate bandwidth).

The resulting routing is not SPFF. In particular, while chunks sent from nodes do follow the shortest path from origin to destination, the nodes do not necessarily transmit to the furthest node first. This can occur because a given node (e.g., the aggregator node) can transmit data to a node that is not the furthest from the destination node during a given timestep (e.g., the first timestep).

Figure 9:
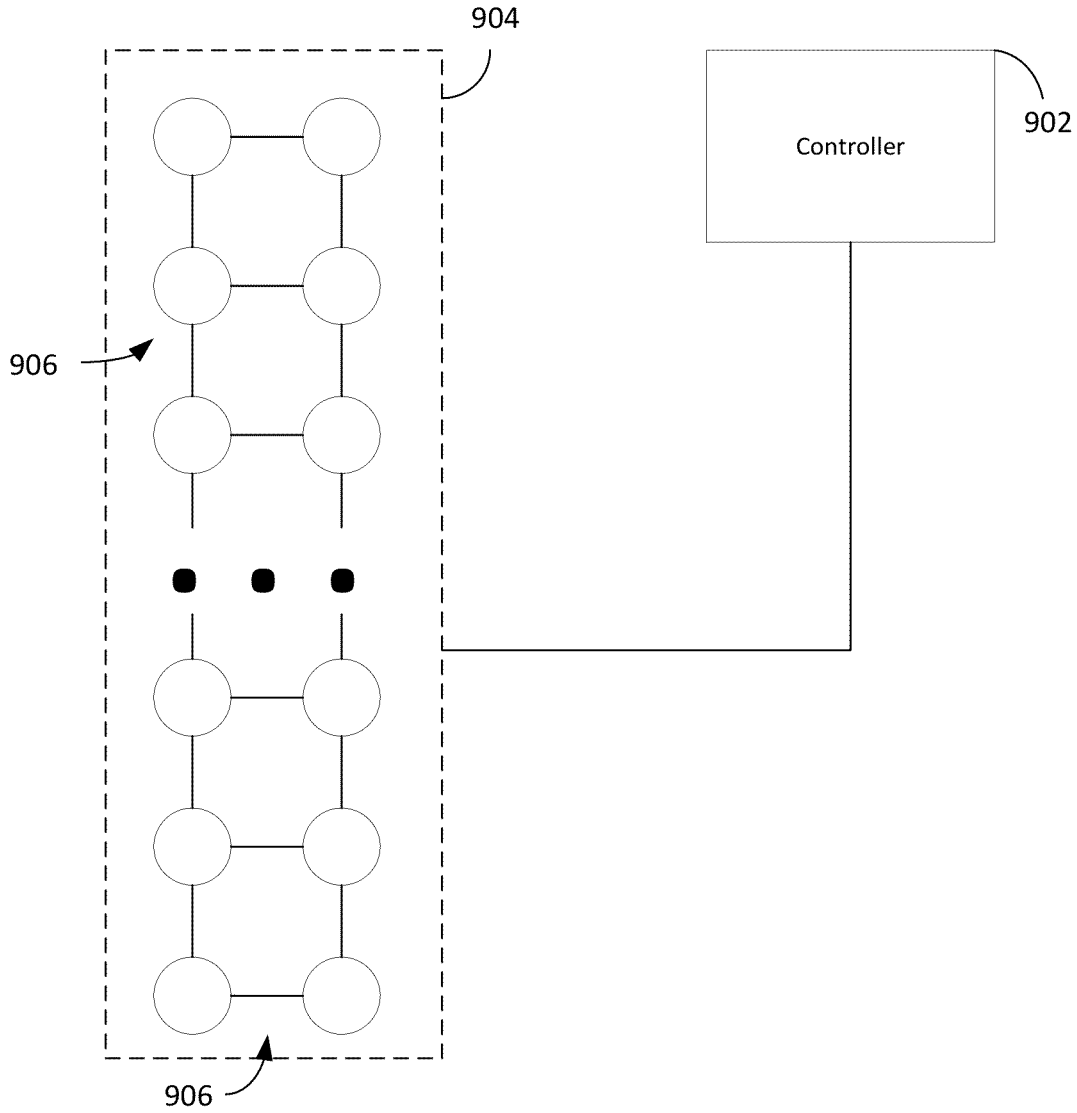
FIG. 9 illustrates a system according to an example.

FIG. 9 illustrates a system 900 that can implement the processes, techniques, and methods disclosed herein according to an example. The system 900 include at least one controller 902 ("controller 902"), and a network 904, the network 904 including a plurality of interconnected nodes 906.

The controller 902 is coupled to the network 904. The plurality of interconnected nodes 906 may be coupled to each other in various ways. The controller 902 is configured to have an outside frame-of-reference of the network 904. That is, the controller 902 may determine, observe, and/or know the topology of the network 904. The controller 902 may provide instructions to the network to implement routing, scheduling, and other networking operations. The controller 902 may determine constraints to apply to the network 904, ensure those constraints are met, and thereby ensure the network 904 is deadlock free. The controller 902 may perform any process, method, technique, and so forth discussed herein, and may control the network 904 to operate according to those processes, methods, techniques, and so forth.

The controller 902 may include memory, storage, sensors (e.g., for observing the network 904), input and output ports, a user interface, and so forth. The controller 902 may include receivers, transmitters, transceivers, and so forth. The controller 902 may be unitary or distributed (e.g., the controller 902 may be a single computer, a collective of processing devices, a cloud infrastructure, and so forth).

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items.

References to "or" may be construed as inclusive so that any terms described using "or" may indicate any of a single, more than one, and all of the described terms. In addition, in the event of inconsistent usages of terms between this document and documents incorporated herein by reference, the term usage in the incorporated features is supplementary to that of this document; for irreconcilable differences, the term usage in this document controls.

Various controllers, such as the controller 902 may execute various operations discussed above. Using data stored in associated memory and/or storage, the controller 902 also executes one or more instructions stored on one or more non-transitory computer-readable media, which the controller 902 may include and/or be coupled to, that may result in manipulated data. In some examples, the controller 902 may include one or more processors or other types of controllers. In one example, the controller 902 is or includes at least one processor. In another example, the controller 902 performs at least a portion of the operations discussed above using an application-specific integrated circuit tailored to perform particular operations in addition to, or in lieu of, a general-purpose processor. As illustrated by these examples, examples in accordance with the present disclosure may perform the operations described herein using many specific combinations of hardware and software and the disclosure is not limited to any particular combination of hardware and software components. Examples of the disclosure may include a computer-program product configured to execute methods, processes, and/or operations discussed above. The computer-program product may be, or include, one or more controllers and/or processors configured to execute instructions to perform methods, processes, and/or operations discussed above.

Having thus described several aspects of at least one embodiment, it is to be appreciated various alterations, modifications, and improvements will readily occur to those skilled in the art. Such alterations, modifications, and improvements are intended to be part of, and within the spirit and scope of, this disclosure. Accordingly, the foregoing description and drawings are by way of example only.

What is claimed is:

1. A method for managing links in a network, the method comprising:

determining a first bandwidth of one or more intracluster links between one or more nodes of a first cluster;

determining a second bandwidth of one or more intercluster links between the first cluster and one or more clusters;

determining an equivalency between the one or more intracluster links and the one or more intercluster links based on the first bandwidth and the second bandwidth;

preparing a routing schedule based on the equivalency; and sending a message from a first node to a second node in the network based on the routing schedule, wherein sending the message from the first node to the second node in the network includes:

partitioning the message into a first portion and a second portion;

sending, from the first node to the second node, the first portion via a first link at a first timestep; and sending, from the first node to the second node, the second portion via a second link at a second timestep, the second timestep following the first timestep.

2. The method of claim 1 wherein preparing the routing schedule based on the equivalency includes:

determining one or more virtual links between the one or more nodes of the first cluster, the one or more virtual links being based on the one or more intracluster links and the equivalency.

3. The method of claim 2 wherein determining the equivalency between the one or more intracluster links and the one or more intercluster links includes:

determining a baseline bandwidth corresponding to a bandwidth of at least one of the one or more intercluster links; and determining the first bandwidth as a multiple of the baseline bandwidth.

4. The method of claim 3 wherein the equivalency is the multiple and a total quantity of the one or more virtual links is based on the multiple and a quantity of the one or more intracluster links.

5. The method of claim 1 further comprising:

determining that a link between a first node and a second node is not functioning properly; and responsive to determining that the link is not functioning properly, redetermining the routing schedule.

6. The method of claim 5 wherein the link not functioning properly corresponds to the link not providing a bandwidth for which the link is rated.

7. The method of claim 1 further comprising:

determining a ratio of the first bandwidth to the second bandwidth;

based on the ratio, determining a cost of sending a message via a link between a first node and a second node in the network; and determining a runtime of an operation on the network based on the cost.

8. The method of claim 7 wherein determining the cost includes:

determining a first cost of one or more intercluster links between the first node and the second node;

determining a second cost of one or more intracluster links between the first node and the second node; and based on the first cost, the second cost, and a size of the message, determining the cost.

9. The method of claim 1 further comprising:

determining one or more first splitting coefficients;

determining one or more second splitting coefficients;

determining the first portion based on the one or more first splitting coefficients;

determining the second portion based on the one or more first splitting coefficients;

determining the first link based on the one or more second splitting coefficients; and determining the second link based on the one or more second splitting coefficients.

10. The method of claim 9 wherein the one or more first splitting coefficients are determined based on one or more constraints including:

a workload constraint limiting the amount of data received by a node to a maximum amount of data, a coefficient limiting constraint limiting a sum of the one or more first splitting coefficients and the one or more second splitting coefficients to one, and a third constraint limiting each splitting coefficient of the one or more first splitting coefficients and the one or more second splitting coefficients to be greater than or equal to zero and less than or equal to one.

11. A non-transitory computer-readable medium containing thereon instructions for instructing at least one processor to manage a network, the instructions instructing the at least one processor to:

determine a first bandwidth of one or more intracluster links between one or more nodes of a first cluster;

determine a second bandwidth of one or more intercluster links between the first cluster and one or more clusters;

determine an equivalency between the one or more intracluster links and the one or more intercluster links based on the first bandwidth and the second bandwidth, wherein the instructions instructing the at least one processor to determine the equivalency further instruct the at least one processor to:

determine a baseline bandwidth corresponding to a bandwidth of at least one of the one or more intercluster links; and determine the first bandwidth as a multiple of the baseline bandwidth;

prepare a routing schedule based on the equivalency, wherein the instructions instructing the at least one processor to prepare the routing schedule based on the equivalency further instruct the at least one processor to:

determine one or more virtual links between the one or more nodes of the first cluster, the one or more virtual links being based on the one or more intracluster links and the equivalency; and send a message from a first node to a second node in the network based on the routing schedule.

12. The non-transitory computer-readable medium of claim 11 wherein the instructions further instruct the at least one processor to:

determine that a link between a first node and a second node is not functioning properly; and responsive to determining that the link is not functioning properly, redetermine the routing schedule.

13. The non-transitory computer-readable medium of claim 11 wherein the instructions further instruct the at least one processor to:

determine a ratio of the first bandwidth to the second bandwidth;

based on the ratio, determine a cost of sending a message via a link between a first node and a second node in the network; and determine a runtime of an operation on the network based on the cost.

14. The non-transitory computer-readable medium of claim 11 wherein the instructions further instruct the at least one processor to:

send the message from the first node to the second node in the network based on the routing schedule by:

partitioning the message into a first portion and a second portion;

sending, from the first node to the second node, the first portion via a first link at a first timestep; and sending, from the first node to the second node, the second portion via a second link at a second timestep, the second timestep following the first timestep.

15. The non-transitory computer-readable medium of claim 14 wherein the instructions further instruct the at least one processor to:

determine one or more first splitting coefficients;

determine one or more second splitting coefficients;

determine the first portion based on the one or more first splitting coefficients;

determine the second portion based on the one or more first splitting coefficients;

determine the first link based on the one or more second splitting coefficients; and determining the second link based on the one or more second splitting coefficients.

16. The non-transitory computer-readable medium of claim 14 wherein the instructions further instruct the at least one processor to determine one or more first splitting coefficients based on one or more constraints including:

a workload constraint limiting the amount of data received by a node to a maximum amount of data, a coefficient limiting constraint limiting a sum of the one or more first splitting coefficients and one or more second splitting coefficients to one, and a third constraint limiting each splitting coefficient of the one or more first splitting coefficients and the one or more second splitting coefficients to be greater than or equal to zero and less than or equal to one.

17. A system for managing links on a network, the system comprising:

a first cluster;

one or more clusters coupled to the first cluster;

a controller configured to control the first cluster and the one or more clusters by:

determining a first bandwidth of one or more intracluster links between one or more nodes of the first cluster;

determining a second bandwidth of one or more intercluster links between the first cluster and the one or more clusters;

determining an equivalency between the one or more intracluster links and the one or more intercluster links based on the first bandwidth and the second bandwidth;

determining a ratio of the first bandwidth to the second bandwidth;

based on the ratio, determining a cost of sending a message via a link between a first node and a second node in the network;

determining a runtime of an operation on the network based on the cost;

preparing a routing schedule based on the equivalency and the runtime; and sending a message from a first node to a second node in the network based on the routing schedule.

\*    \*    \*    \*    \*